(12) United States Patent
Otsuka et al.

(10) Patent No.: US 8,868,729 B2
(45) Date of Patent: Oct. 21, 2014

(54) INFORMATION COLLECTION DEVICE, INFORMATION COLLECTION PROGRAM, AND METHOD

(75) Inventors: Hiroshi Otsuka, Kawasaki (JP); Akira Katsuno, Kawasaki (JP); Yuji Wada, Kawasaki (JP); Masazumi Matsubara, Kawasaki (JP); Kenji Morimoto, Tokyo (JP); Yasuhide Matsumoto, Kawasaki (JP); Yukihiro Watanabe, Kawasaki (JP); Kuniaki Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 355 days.

(21) Appl. No.: 12/979,113

(22) Filed: Dec. 27, 2010

(65) Prior Publication Data

US 2011/0131323 A1 Jun. 2, 2011

Related U.S. Application Data

(63) Continuation of application No. PCT/JP2008/062189, filed on Jul. 4, 2008.

(51) Int. Cl.
G06F 15/173 (2006.01)

(52) U.S. Cl.
USPC .......................................... 709/224; 709/225

(58) Field of Classification Search
USPC ................................................ 709/223, 224
See application file for complete search history.

(56) References Cited

U.S. PATENT DOCUMENTS

| | | | | |
|---|---|---|---|---|
| 5,748,098 A | * | 5/1998 | Grace ........................... | 709/224 |
| 5,822,535 A | * | 10/1998 | Takase et al. ................. | 709/223 |
| 6,212,171 B1 | * | 4/2001 | LaFollette et al. ........... | 370/257 |
| 6,389,549 B1 | * | 5/2002 | Murase ......................... | 713/502 |
| 6,466,007 B1 | * | 10/2002 | Prazeres da Costa et al. ........................ | 324/762.02 |
| 6,718,537 B1 | * | 4/2004 | Miles ............................ | 717/127 |

(Continued)

FOREIGN PATENT DOCUMENTS

| | | |
|---|---|---|
| JP | 2004-199410 | 7/2004 |
| JP | 2004-355061 | 12/2004 |

(Continued)

OTHER PUBLICATIONS

English translation of the International Preliminary Report on Patentability issued in International App. No. PCT/JP2008/062189, issued Feb. 8, 2011.

(Continued)

*Primary Examiner* — Madhu Woolcock
(74) *Attorney, Agent, or Firm* — Greer Burns & Crain Ltd.

(57) ABSTRACT

An information collection device acquires information from a plurality of devices connected through a network. The information collection device includes: a first addition unit that adds, for each of the devices, an information collection duration required to collect information of the devices to a communication duration required to communicate with the devices; a second addition unit that adds a maximum duration among the durations by addition of the first addition unit to a predetermined time to obtain a first time; a subtraction unit that subtracts the information collection duration of each of the devices from the first time; a first setting unit that sets a time obtained by the subtraction unit as a second time that is when information collection starts at each of the devices; and an acquisition unit that acquires information obtained by the information collection that starts at the second time.

14 Claims, 12 Drawing Sheets

(56) References Cited

U.S. PATENT DOCUMENTS

| | | | |
|---|---|---|---|
| 6,886,020 B1 * | 4/2005 | Zahavi et al. | 1/1 |
| 7,051,026 B2 * | 5/2006 | Berry et al. | 1/1 |
| 7,890,620 B2 * | 2/2011 | Masuda et al. | 709/224 |
| 8,214,488 B2 * | 7/2012 | Machida | 709/224 |
| 8,589,339 B2 * | 11/2013 | Nakamura | 707/609 |
| 2005/0010667 A1 * | 1/2005 | Moriki et al. | 709/226 |
| 2006/0080433 A1 * | 4/2006 | Caselli et al. | 709/224 |
| 2006/0104220 A1 * | 5/2006 | Yamazaki et al. | 370/254 |
| 2006/0259905 A1 * | 11/2006 | Diao et al. | 718/100 |
| 2006/0265497 A1 * | 11/2006 | Ohata et al. | 709/224 |
| 2007/0132477 A1 * | 6/2007 | Balog et al. | 324/765 |
| 2007/0192473 A1 * | 8/2007 | Fukuda et al. | 709/223 |
| 2008/0063216 A1 * | 3/2008 | Sakata et al. | 381/80 |
| 2009/0141646 A1 * | 6/2009 | Legg | 370/252 |
| 2009/0182534 A1 * | 7/2009 | Loboz | 702/186 |

FOREIGN PATENT DOCUMENTS

| | | |
|---|---|---|
| JP | 2006-079488 | 3/2006 |
| JP | 2006-344003 | 12/2006 |
| JP | 2007-128122 | 5/2007 |
| WO | WO 2008056670 A1 * | 5/2008 |

OTHER PUBLICATIONS

International Search Report issued in International App. No. PCT/JP2008/062189, mailed Aug. 12, 2008.

* cited by examiner

FIG. 2

COLLECTION HISTORY INFORMATION

| SERVER A | | | | |
|---|---|---|---|---|
| COLLECTION ITEM | COLLECTION TIME | DATA SIZE | COLLECTION DURATION | DELAY TIME |
| ps | 9:00:00 | 0.1k | – | 1002ms |
| free | 9:00:00 | 1k | – | 1001ms |
| df | 9:00:00 | 0.1k | – | 999ms |
| ps | 9:01:01 | 0.1k | – | 1004ms |
| ps | 9:02:00 | 0.1k | – | 996ms |
| sar | 9:03:10 | 10k | 10min | 998ms |

COLLECTION ITEM INFORMATION

| SERVER A | | | |
|---|---|---|---|
| COLLECTION ITEM | ACQUISITION NUMBER | CHANGE NUMBER | COLLECTION DURATION |
| ps | 100 | 100 | – |
| free | 100 | 70 | – |
| df | 100 | 100 | – |
| dmesg | 100 | 100 | – |
| fstab | 100 | 1 | – |
| sar | 100 | 100 | 10min |

DEVICE INFORMATION

| DEVICE NAME | COLLECTION TARGET | ESTIMATED DELAY TIME |
|---|---|---|
| SERVER A | ps, df, free, sar | 1s |
| SERVER B | ps, df, free, sar | 2s |
| SERVER C | ps, df, free, sar | 3s |

DEVICE INFORMATION

| DEVICE NAME | COLLECTION TARGET | ESTIMATED DELAY TIME |
|---|---|---|
| SERVER A | ps, df, free, sar | 1s |
| SERVER B | ps, df, free, sar | 2s |
| SERVER C | ps, df, free, sar | 3s |

COLLECTION ITEM INFORMATION

| SERVER A | | | |
|---|---|---|---|
| COLLECTION ITEM | ACQUISITION NUMBER | CHANGE NUMBER | COLLECTION DURATION |
| ➡ ps | 100 | 100 | — |
| ➡ free | 100 | 70 | — |
| ➡ df | 100 | 100 | — |
| dmesg | 100 | 100 | — |
| fstab | 100 | 1 | — |
| ➡ sar | 100 | 100 | 10min |

SELECT COLLECTION ITEM RECORDED IN "COLLECTION TARGET"

FIG. 9

COLLECTION ITEM LIST

| SERVER A | | |
|---|---|---|
| COLLECTION ITEM | FREQUENCY OF CHANGE | COLLECTION DURATION |
| ps | 1 | — |
| free | 0.7 | — |
| df | 1 | — |
| sar | 1 | 10min |

FIG. 10

| SERVER A | | |
|---|---|---|
| COLLECTION ITEM | FREQUENCY OF CHANGE | COLLECTION DURATION |
| ps | 1 | − |
| free | 0.7 | − |
| df | 1 | − |
| sar | 1 | 10min |

REARRANGE IN DESCENDING ORDER OF COLLECTION DURATION

| SERVER A | | |
|---|---|---|
| COLLECTION ITEM | FREQUENCY OF CHANGE | COLLECTION DURATION |
| sar | 1 | 10min |
| ps | 1 | − |
| free | 0.7 | − |
| df | 1 | − |

REARRANGE ITEMS HAVING SAME COLLECTION DURATION IN DESCENDING ORDER OF FREQUENCY OF CHANGE

| SERVER A | | |
|---|---|---|
| COLLECTION ITEM | FREQUENCY OF CHANGE | COLLECTION DURATION |
| sar | 1 | 10min |
| ps | 1 | − |
| df | 1 | − |
| free | 0.7 | − |

| DEVICE NAME | COLLECTION TARGET | NOTIFICATION DURATION |
|---|---|---|
| SERVER A | ps, df, free, sar | 10min 1s |
| SERVER B | ps, df, free, sar | 2s |
| SERVER C | ps, df, free, sar | 20min 3s |

REARRANGE IN DESCENDING ORDER OF NOTIFICATION DURATION

| DEVICE NAME | COLLECTION TARGET | NOTIFICATION DURATION |
|---|---|---|
| SERVER C | ps, df, free, sar | 20min 3s |
| SERVER A | ps, df, free, sar | 10min 1s |
| SERVER B | ps, df, free, sar | 2s |

NOTIFICATION SCHEDULE

SUBTRACT COLLECTION DURATION FROM
DATA ACQUISITION TIME 19:00

| SERVER A | | | |
|---|---|---|---|
| COLLECTION ITEM | FREQUENCY OF CHANGE | COLLECTION DURATION | COLLECTION TIME |
| sar | 1 | 10min | 18:50:00 |
| ps | 1 | – | 19:00:00 |
| df | 1 | – | 19:00:00 |
| free | 0.7 | – | 19:00:00 |

COLLECTION SCHEDULE

INFORMATION COLLECTION DEVICE, INFORMATION COLLECTION PROGRAM, AND METHOD

CROSS-REFERENCE TO RELATED APPLICATIONS

This application is a continuation application, filed under 35 U.S.C. §111(a), of PCT Application No. PCT/JP2008/062189, filed Jul. 4, 2008, the disclosure of which is herein incorporated in its entirety by reference.

FIELD

The present invention relates to an information collection technique in an IT system.

BACKGROUND

In recent years, society has been increasingly dependent on IT systems as the IT systems have been applied to more areas. As a result, the IT systems have been turned into a social infrastructure. As the international community has been globalized, data centers that make up the IT systems are spread across the world. In response to such circumstances, the operational control and failure response operations of the IT systems are conducted in more complicated ways and on larger scale. Given the above fact, it is necessary to carry out investigation into failures on the basis of the assumption that the operation of a system is complex as well as to collect information in order to carry out investigation into failures.

Figure 18:
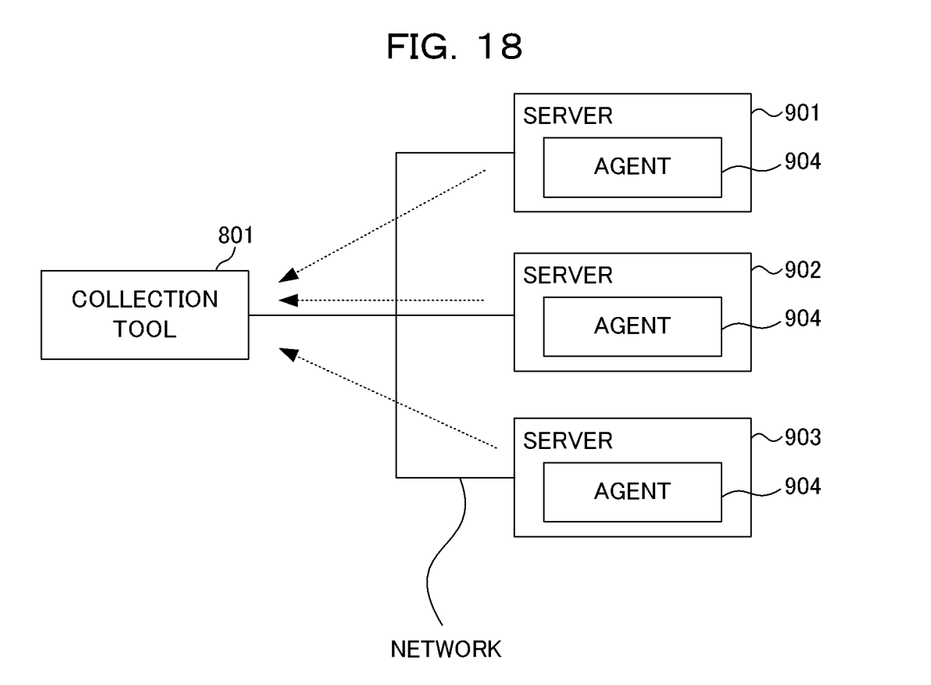
FIG. 18 is a block diagram illustrating a conventional information collection system.

As techniques of collecting information needed to carry out investigation into failures as described above, a collection tool and a collection agent are well known. The following describes the techniques with reference to the accompanying drawings. FIG. 18 is a block diagram illustrating a conventional information collection system.

As illustrated in FIG. 18, the conventional information collection system includes servers 901 to 903 and a collection tool 801 connected to the servers through a network. The servers 901 to 903 are equipped with agents 904 that collect information. The agents 904 collect information pertaining to predetermined items at predetermined intervals or at a predetermined time and transmit the collected information to the collection tool 801. Thanks to the above configuration, the conventional IT system uses the agents 904 installed in the servers to collect information and uses the information that the collection tool 801 acquires from the agents 904 to carry out investigation into failures.

What is known as a conventional technique related to the present invention is a data collection device, a data collection system and a data collection method that: calculates a usage amount rate of each factor for each to-be-collected data item; generates a schedule that enables data to be collected at a time when a calculated operating rate is low; and collects the predetermined data on the basis of the generated schedule for carrying out collection (see Patent Document 1, for example).
[Patent Document 1] Japanese Laid-open Patent Publication No. 2006-79488

However, the problem with the information collection method of the conventional IT system is that due to the delay of network communication and different loads of information collection operations on the agents 904 of the servers 901 to 903, a time lag occurs between the pieces of information acquired by the collection tool 801 as a result. Another problem is that since the time lag occurs between the acquired pieces of information, it is difficult to grasp the causal relationship between the pieces of information and, as circumstantial evidence, the reliability is low. Moreover, according to the information collection technique of the conventional IT system, information is collected at predetermined intervals or at a predetermined time. Therefore, for example, the problem is that it is impossible to collect information immediately after a failure occurs or at other arbitrary timings.

SUMMARY

According to an aspect of the invention, there is provided an information collection device that acquires information from a plurality of devices connected through a network, including: a first addition unit that adds, for each of the plurality of devices, an information collection duration that is a duration required to collect information of the devices to a communication duration that is a duration required to communicate with the devices; a second addition unit that adds a maximum duration that is the largest among the durations added by the first addition unit to a predetermined time; a subtraction unit that subtracts the information collection duration of each of the plurality of devices from a first time that is a time obtained after the maximum duration is added by the second addition unit to the predetermined time; a first setting unit that sets a time obtained after the subtraction unit subtracts the information collection duration of each of the plurality of devices from the first time as a second time that is when information collection starts at each of the plurality of devices; and an acquisition unit that acquires information obtained by the information collection that starts at the second time set by the first setting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, an embodiment of the present invention will be described with reference to the accompanying drawings.

Figure 1:
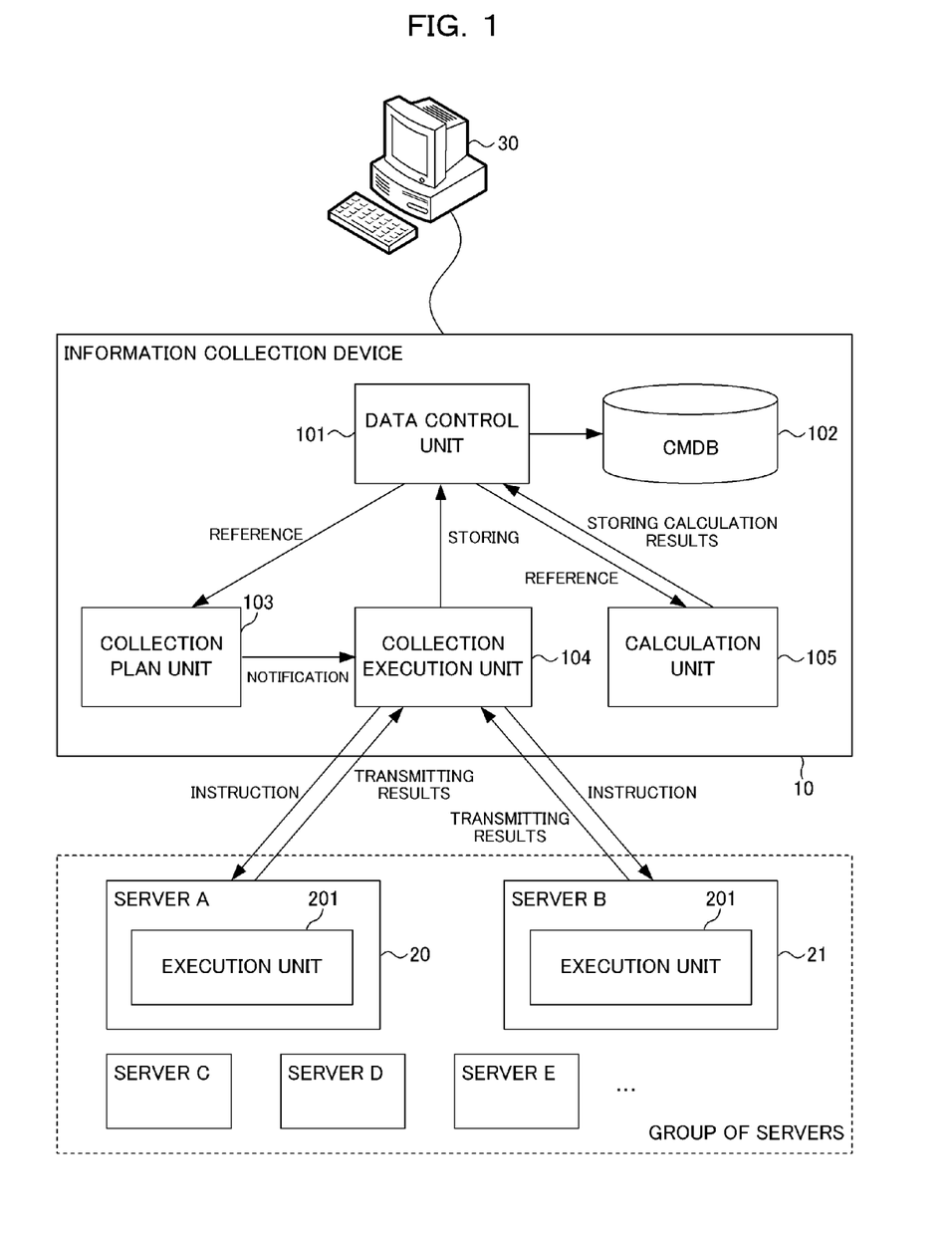
FIG. 1 is a block diagram illustrating the configuration of an information collection device according to an embodiment of the present invention.
Figure 2:
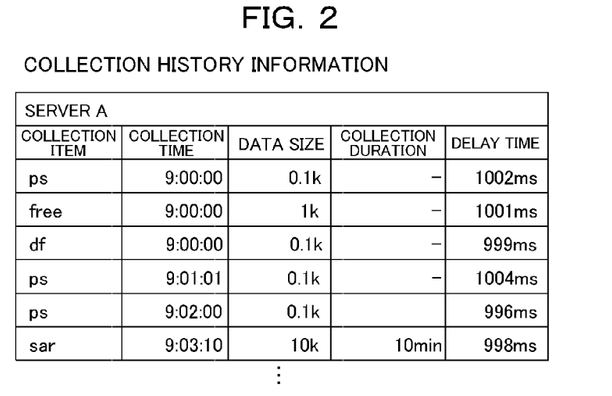
FIG. 2 is a diagram illustrating collection history information.
Figure 3:
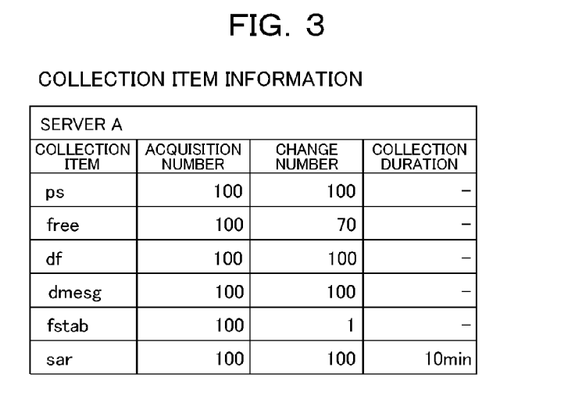
FIG. 3 is a diagram illustrating collection item information.
Figure 4:
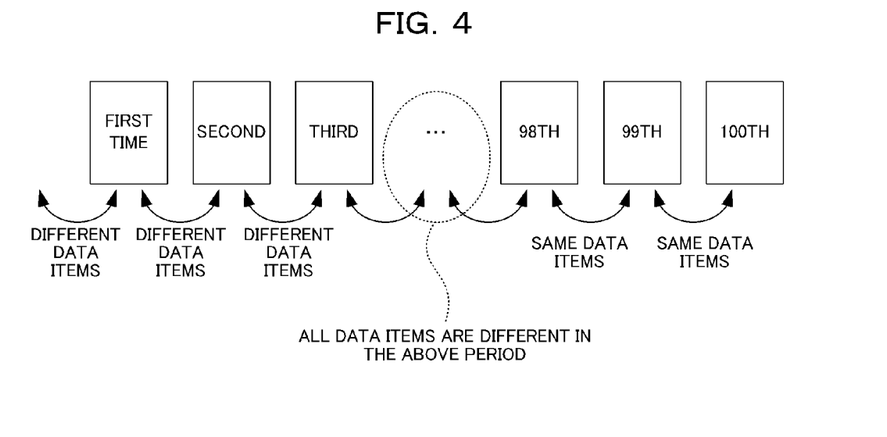
FIG. 4 is a diagram illustrating the number of changes made in the collection item information.
Figure 5:
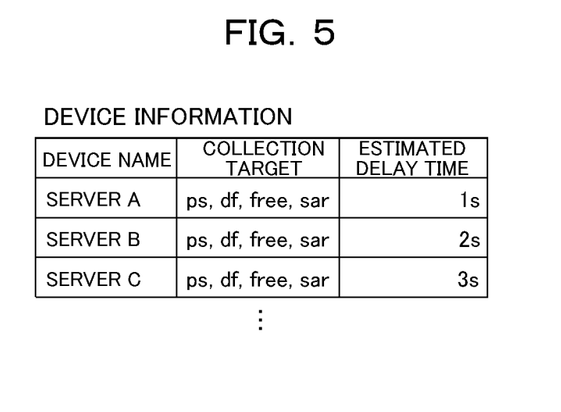
FIG. 5 is a diagram illustrating device information.

The following describes the configuration of an information collection device according to the present embodiment. FIG. 1 is a block diagram illustrating the configuration of an information collection device according to the present embodiment. FIG. 2 is a diagram illustrating collection history information. FIG. 3 is a diagram illustrating collection item information. FIG. 4 is a diagram illustrating the number of changes made in the collection item information. FIG. 5 is a diagram illustrating device information.

As illustrated in FIG. 1, an information collection device 10 of the present embodiment is connected to a group of servers (a plurality of devices) including a server A 20 and a server B 21 and a client terminal 30. The information collection device 10 is equipped with a data control unit 101, a CMDB (Configuration Management Database) 102, a collection plan unit 103 (a first addition unit), a collection execution unit 104 (a second addition unit, a subtraction unit, a first setting unit, and an acquisition unit), and a calculation unit 105 (a frequency-of-change calculation unit and a second setting unit). Any servers other than the server A 20 and server B 21 in the group of servers are the same as the server A 20 and server B 21 and therefore will not be described.

The CMDB 102 stores information about resources of devices that make up a connected system, such as the server A 20 and server B 21. The CMDB 102 also stores various kinds of information, including collection history information, collection item information and device information.

Among information stored in the CMDB 102, the collection history information, the collection item information and the device information will be described. Incidentally, the items will be described later. As illustrated in FIG. 2, the collection history information is a history of collected items of a specific device (which is a server according to the present embodiment). The following are linked to each other: "Collection item" that indicates an item, "Collection time" that is when collection takes place, "Data size" representing the data size of item information, and "Delay Time" representing a network delay in collecting the item information or the time required for communication between the information collection device and each server.

As illustrated in FIG. 3, the collection item information is information about items of a specific device based on the collection history information of "Collection item" that represents an item. The following are linked to each other: "Acquisition number" that represents the number of times an item is acquired, "Change number" that represents the number of times the item is changed, and "Collection duration" that represents the time required to acquire the item. Among the above information, the information "Change number" is updated at regular intervals by the calculation unit 105 on the basis of the collection history information. As for "Change number," as illustrated in FIG. 4, the initially collected data item is counted as one change, and the subsequently collected information is compared with the preceding acquired information; if there is a difference between the data items, the data item is counted as being changed. For example, as illustrated in FIG. 4, assume that information is collected 100 times. If there is no difference only between the 98th, 99th and 100th pieces of collected information, "Change time" comes to 98.

A device list illustrated in FIG. 5 is a list illustrating devices and items specified in an acquisition request process by the client terminal 30. On the device list, the following are linked to each other: "Device name" that represents a device or a target from which information is acquired, "Collection target" that represents an item in the specified device, "Estimated delay time" that represents a delay time calculated by the calculation unit 105.

Incidentally, in the collection history information, the collection item information and the device information, the following are commands used to acquire information of resources of the group of servers: ps, df, sar, and free (collection items or collection targets). ps is a command used to acquire a list of processes running on a device. df is a command used to acquire the state of how a disk is used. sar is a command used to acquire various kinds of performance information of a device (The duration of one observation process and the number of times the observation process takes place may be specified). free is a command used to acquire the usage information of a memory. dmesg and fstab are also commands used to acquire information about a device. Accordingly, from a practical perspective, the items represent information acquired by the above commands. Incidentally, any information stored in the CMDB 102 other than the collection history information, the collection item information and the device information will be described later.

The data control unit 101 controls the CMDB 102. The calculation unit 105 calculates the frequency of change on the basis of the number of times an item is acquired and the number of times an item is changed recorded in the collection item information. The calculation unit 105 also calculates the estimated delay time in the device information, or the delay time of each server, on the basis of the delay time recorded in the collection history information. The collection plan unit 103 makes a schedule of collection on the basis of the information calculated by the calculation unit 105. The collection execution unit 104 notifies an execution 201 that each server has, which is described later, of a collection start time of an item in accordance with the schedule made by the collection plan unit 103. The collection execution unit 104 may collect data from each server in accordance with schedule made by the collection plan unit 103.

The server A 20 and server B 21 are equipped with execution units 201. After being notified by the collection execution unit of the information collection device 10, the execution units 201 collect the specified information. The client terminal 30 requests device information from the information collection device 10.

Figure 6:
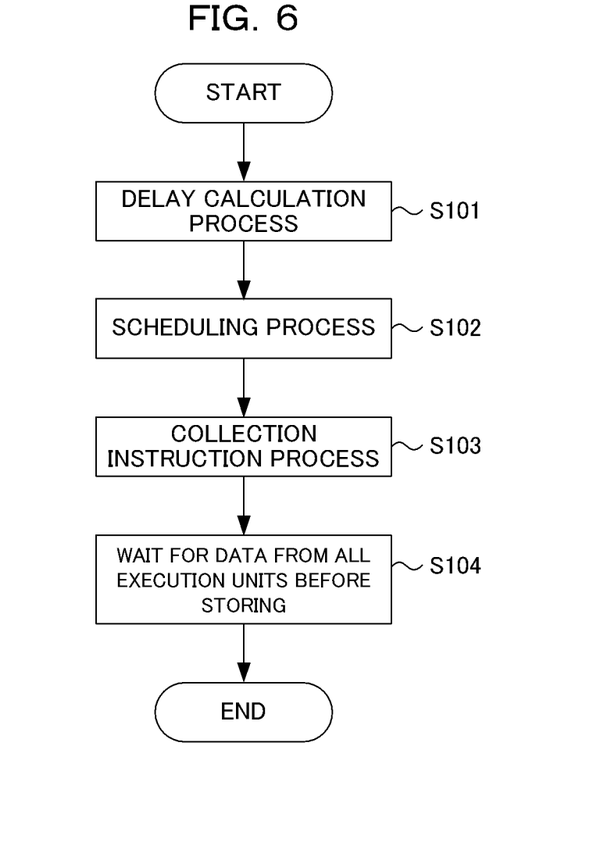
FIG. 6 is a flowchart illustrating the overall operation of the information collection device according to an embodiment of the present invention.

The following describes the operation of the information collection device according to the present embodiment. FIG. 6 is a flowchart illustrating the overall operation of the information collection device according to the present embodiment. Incidentally, in the case of FIG. 6, suppose that a request for acquiring information of a specific item about a specific device has already been made by the client terminal 30 and that the requested information about the device and the item have already been stored in the CMDB as device information.

First, the calculation unit 105 performs a delay calculation process in which the client terminal 30 calculates the delay time and the frequency of change pertaining to the specified device (S101). Then, on the basis of the delay time and frequency of change calculated by the calculation unit 105 in the delay calculation process, the collection plan unit 103 performs a scheduling process to make a schedule of collection (S102). After a schedule of collection is made by the collection plan unit 103 in the scheduling process, the collection execution unit 104 performs a collection instruction process to give the execution units 201 instructions to collect (S103). After the information about devices are transmitted from all the execution units 201, the transmitted information is stored in the CMDB 102 via the data control unit 101 (S104; acquisition step). Incidentally, the operations of the delay calculation process, the scheduling process, and the collection instruction process will be described later in detail.

Figure 7:
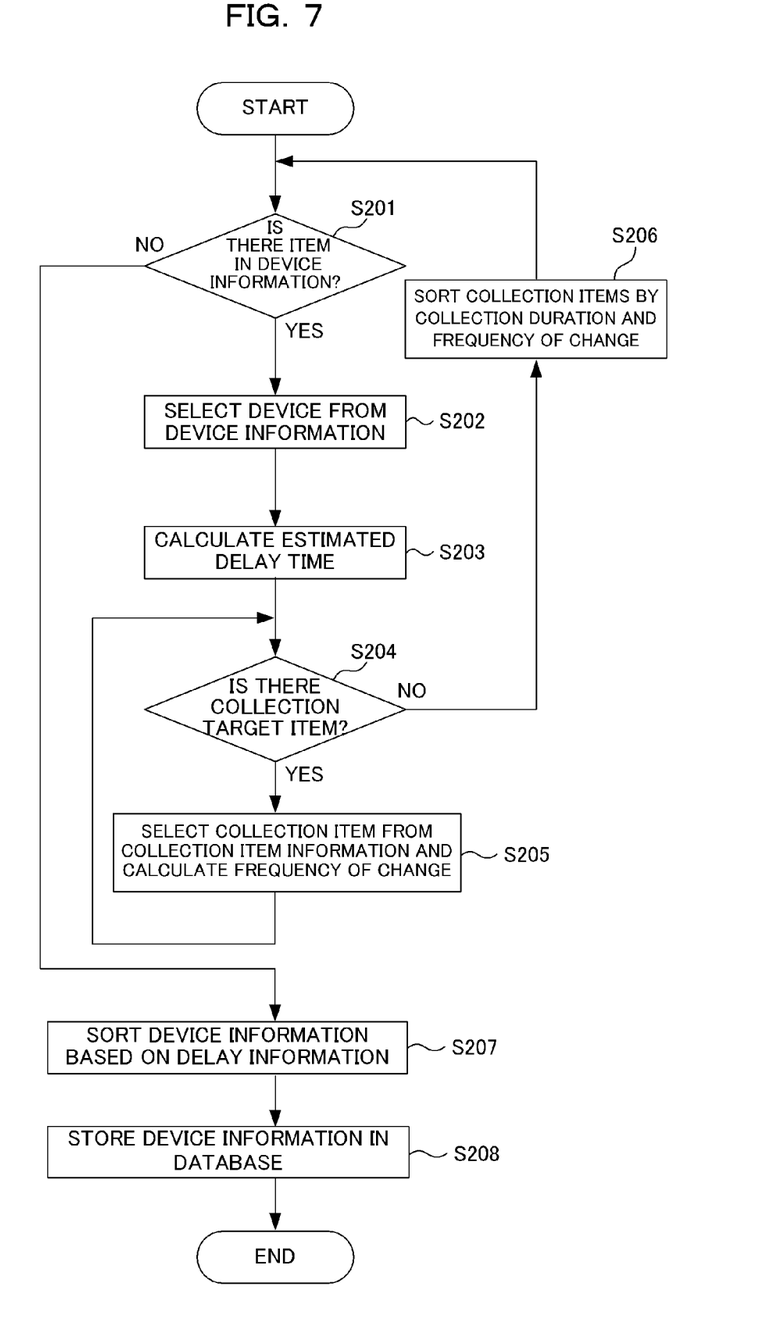
FIG. 7 is a flowchart illustrating the operation of a delay calculation process.
Figure 8:
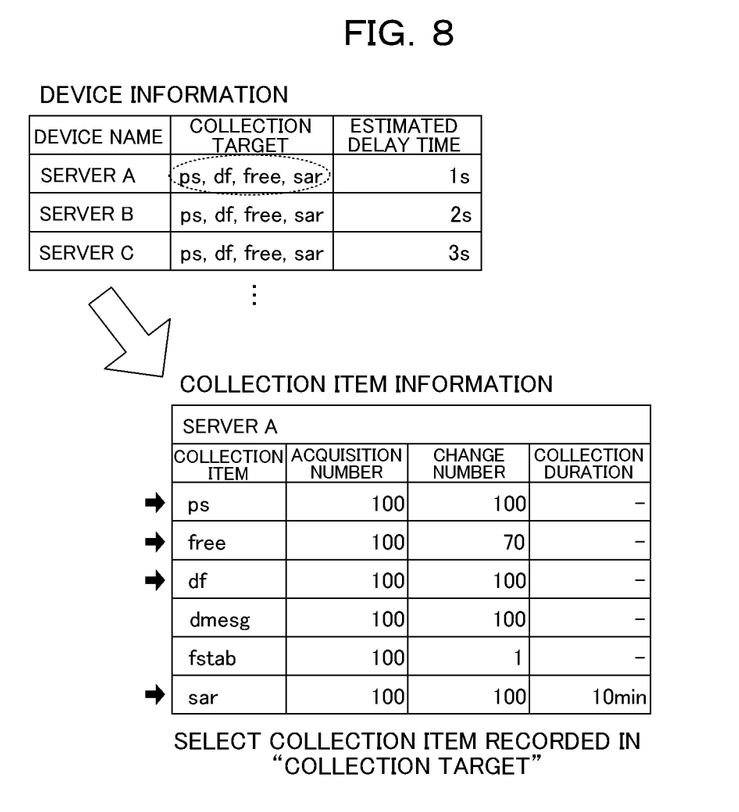
FIG. 8 is a diagram illustrating an example of how collection items are selected.
Figure 9:
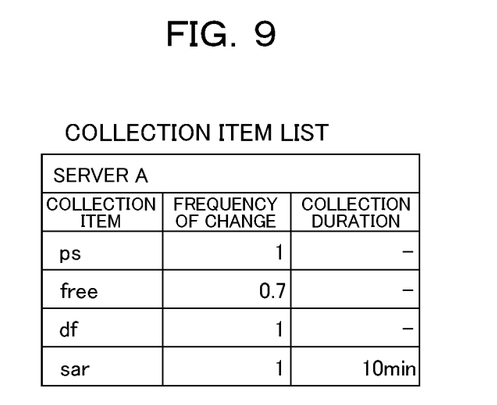
FIG. 9 is a diagram illustrating a collection item list.
Figure 10:
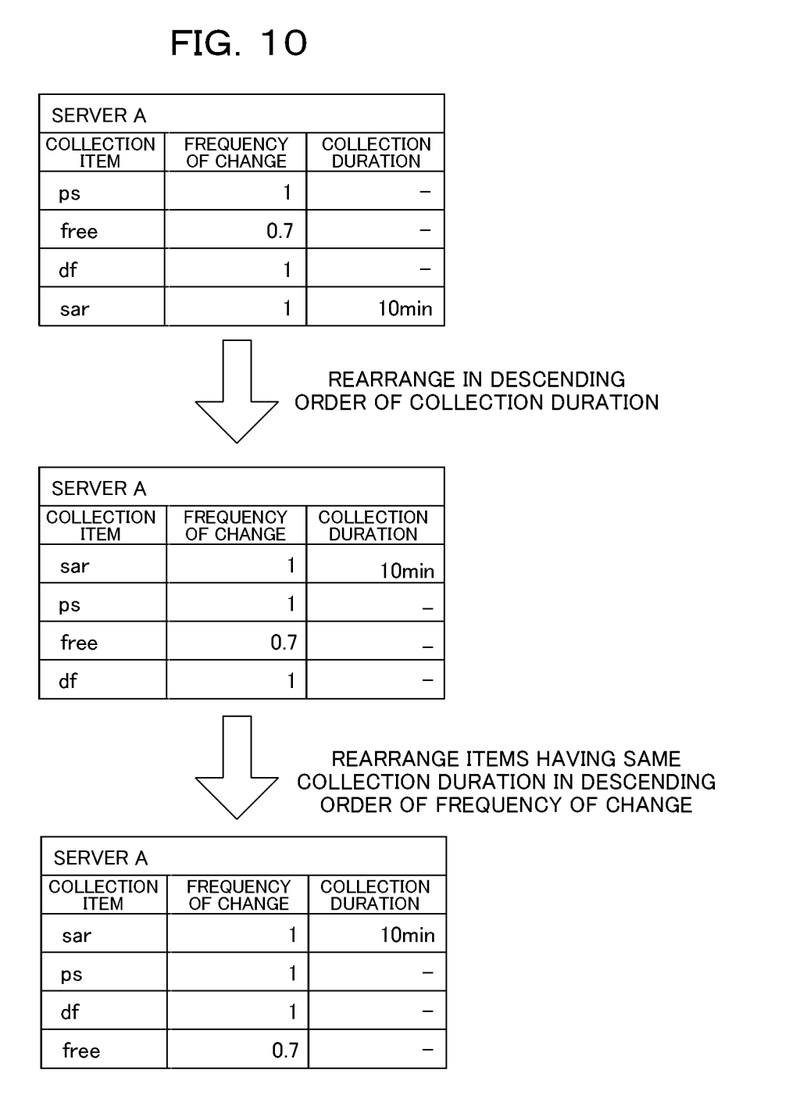
FIG. 10 is a diagram illustrating an example of how a collection item list is rearranged.

The following describes the delay calculation process performed by the calculation unit. FIG. 7 is a flowchart illustrating the operation of the delay calculation process. FIG. 8 is a diagram illustrating an example of how collection items are selected. FIG. 9 is a diagram illustrating a collection item list. FIG. 10 is a diagram illustrating an example of how a collection item list is rearranged. Incidentally, in the case of FIG. 7, suppose that a request for acquiring information of a specific item about a specific device has already been made by the client terminal 30.

First, the calculation unit 105 makes reference to the device information and makes a determination as to whether there is an unselected device in the device information (S201).

When there is an unselected device in the device information (S201, YES), the calculation unit 105 selects the unselected device from the device information (S202) and calculates an estimated delay time (communication duration) for the device added to the device information (S203). The estimated delay time is calculated so that the estimated delay time represents the average delay time of all the collection items of the collection history information of each device. The calculated estimated delay time is linked to the device and the collection target in the device information.

The calculation unit 105 then makes a determination as to whether there is an unselected collection target item for the selected device (S204).

When there is an unselected collection target item (S204, YES), the calculation unit 105 selects, in the collection item information, one unselected collection item from among collection targets in the device information as illustrated in FIG. 8 and calculates the frequency of change of the selected collection item (S205; frequency-of-change calculation step). The frequency of change is a value calculated by dividing the number of times the selected collection item is acquired by the number of times the selected collection item is changed in the collection item information. After calculating the frequency of change, the calculation unit 105 makes a determination again as to there is an unselected collection target item for the selected device (S204).

When there is no unselected collection target item, i.e. when all collection targets in the device information have been selected in the collection item information (S204, NO), the calculation unit 105 turns the collection history information of the collection item that is selected based on the collection target of the device information into a collection item list as illustrated in FIG. 9 and sorts the collection item list (S206; second setting step). Specifically, as illustrated in FIG. 10, the calculation unit 105 rearranges the items of the collection item list in descending order of collection duration. The calculation unit 105 also rearranges the items having the same collection duration in descending order of the frequency of change. After sorting the collection item list, the calculation unit 105 refers to the device information again and makes a determination as to whether there is an unselected device in the device information (S201).

When there is no unselected device in the device information at step S201 (S201, NO), the calculation unit 105 rearranges the device information in descending order of delay information (S207) and stores the device information and the collection item list in the CMDB 102 through the data control unit 101 (S208).

Figure 11:
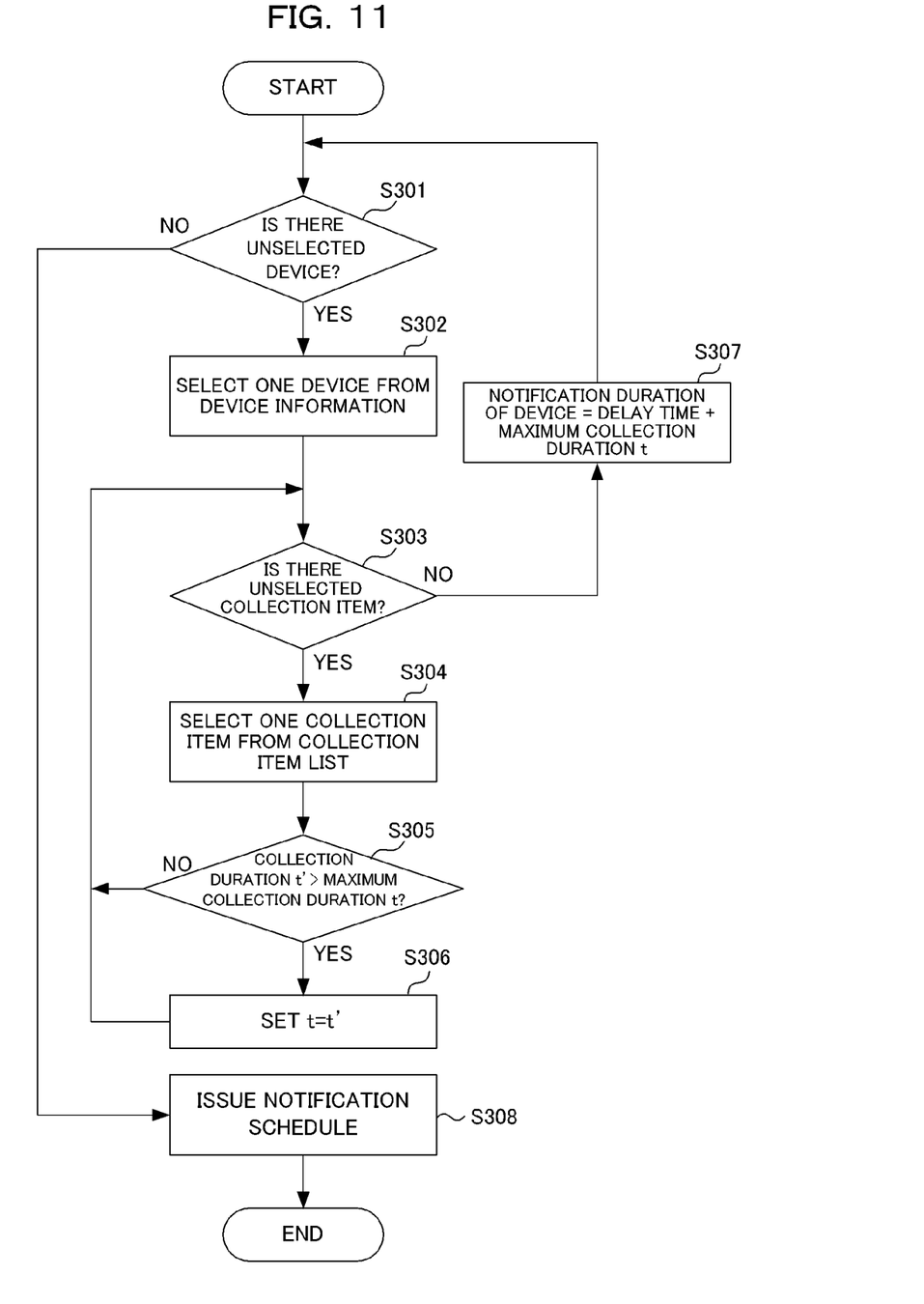
FIG. 11 is a flowchart illustrating the operation of a scheduling process.
Figure 12:
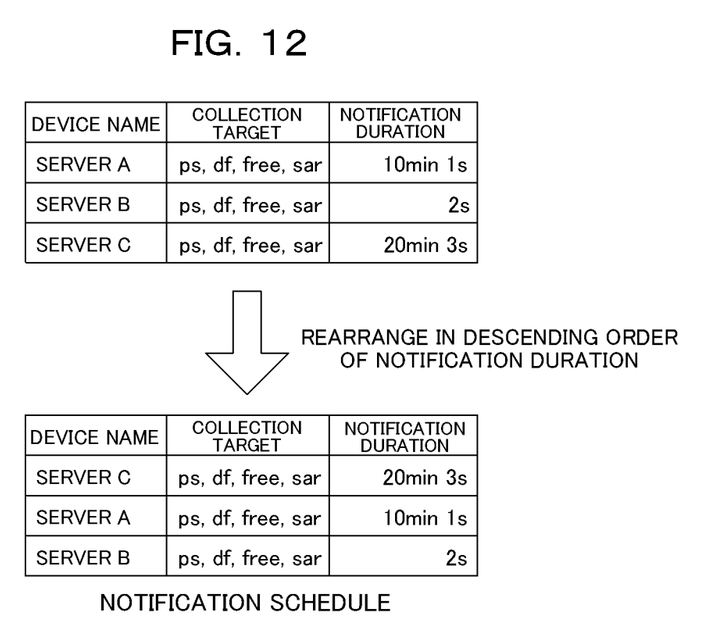
FIG. 12 is a diagram illustrating a notification schedule.

The following describes the scheduling process performed by the collection plan unit. FIG. 11 is a flowchart illustrating the operation of the scheduling process. FIG. 12 is a diagram illustrating a notification schedule. Incidentally, in the case of FIG. 11, suppose that the device information and the collection item list have already been stored in the CMDB 102.

First, the collection plan unit 103 refers to the device information stored in the CMDB 102 through the data control unit 101 to make a determination as to whether there is an unselected device in the device information (S301).

When there is an unselected device in the device information (S301, YES), the collection plan unit 103 selects one unselected device from the device information and refers to the collection item list of the selected device. The collection plan unit 103 makes a determination as to whether there is an unselected collection item in the collection item list (S303).

When there is an unselected collection item in the collection item list (S303, YES), the collection plan unit 103 selects one unselected collection item from the collection item list and makes a determination as to whether the collection duration t' of the selected collection item is greater than maximum collection duration t (S305). Incidentally, the maximum collection duration t is a variable in which stored is the longest collection duration in the collection item list.

When the collection duration t' of the selected collection item is greater than the maximum collection duration t (S305, YES), the collection plan unit 103 sets t=t' (S306).

When the collection duration t' of the selected collection item is less than or equal to the maximum collection duration t (S305, NO), the collection plan unit 103 makes a determination again as to whether there is an unselected collection item in the collection item list (S303).

When there is no unselected collection item in the collection item list at step S303 (S303, NO), the collection plan unit 103 adds the delay time of the device's device list and the maximum collection duration t and adds the result to the device list as notification duration (S307; first addition step). The collection plan unit 103 makes a determination again as to whether there is an unselected device in the device list (S301).

When there is no unselected device in the device list at step S301 (S301, NO), the collection plan unit 103 rearranges the device list in descending order of notification duration to create a notification schedule as illustrated in FIG. 12. The collection plan unit 103 issues the notification schedule and the collection item list to the collection execution unit 104 (S308).

Figure 13:
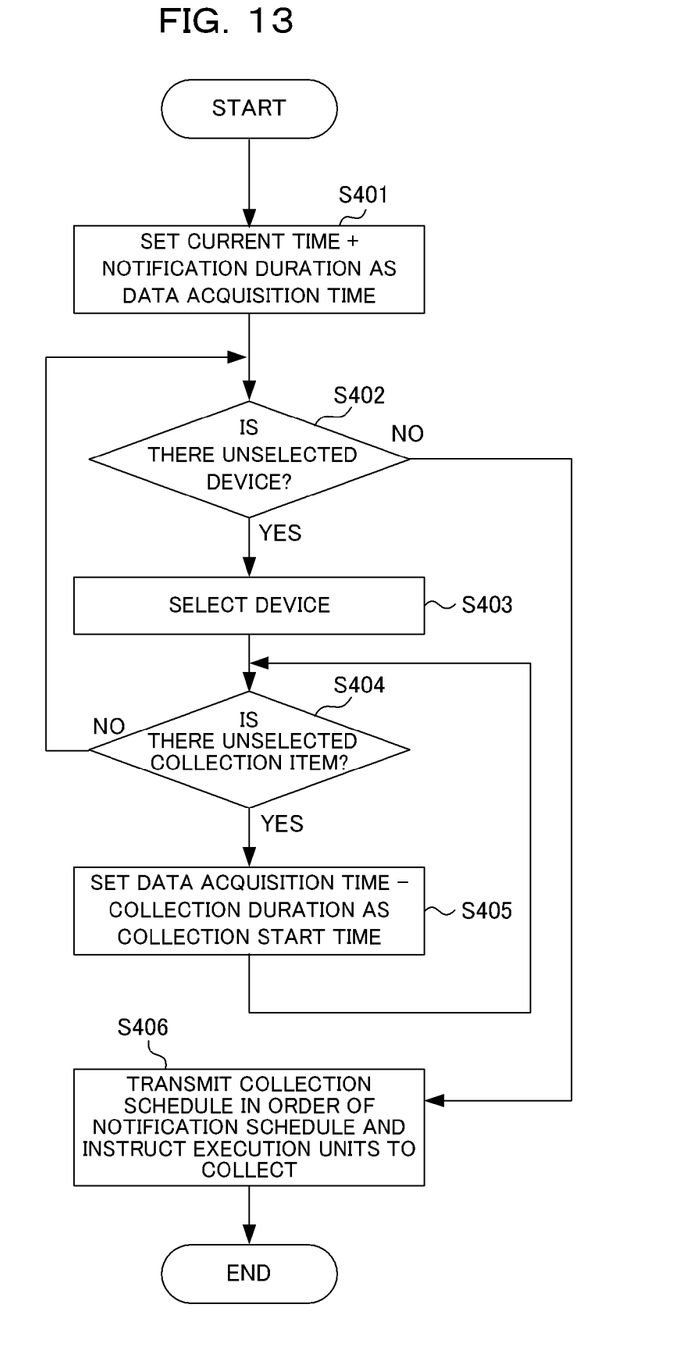
FIG. 13 is a flowchart illustrating the operation of a collection instruction process.
Figure 14:
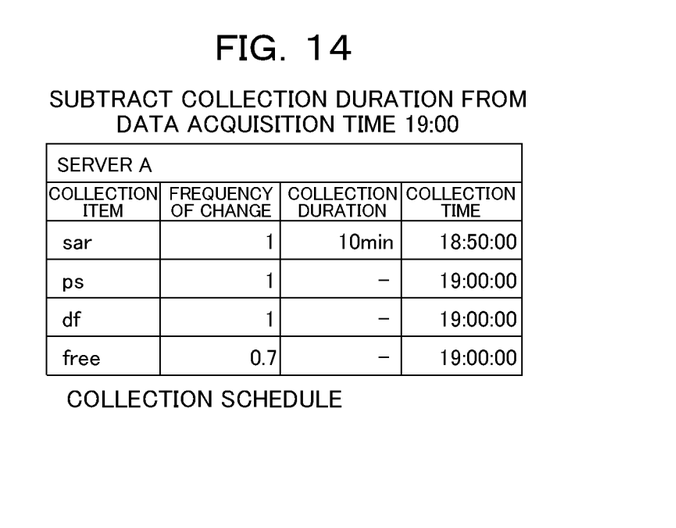
FIG. 14 is a diagram illustrating a collection schedule.

The following describes a collection instruction process performed by the collection execution unit. FIG. 13 is a flowchart illustrating the operation of the collection instruction process. FIG. 14 is a diagram illustrating a collection schedule. Incidentally, in the case of FIG. 13, suppose that the notification schedule and the collection item list have been already issued from the collection plan unit to the collection execution unit.

First, the collection execution unit 104 refers to the notification schedule, adds the longest notification duration (maximum duration) in the notification schedule, i.e. the notification duration linked to the top device, to the current time, and regards the result as a data acquisition time (first time) (S401; second addition unit). Then, the collection execution unit 104 makes a determination as to whether there is an unselected device in the notification schedule (S402).

When there is an unselected device in the notification schedule (S402, YES), the collection execution unit 104 selects the device (S403) and makes a determination as to whether there is an unselected collection item in the collection item list of the selected device (S404).

When there is an unselected collection item in the collection item list (S404, YES), the collection execution unit 104 selects the collection item and sets the time calculated by subtracting the collection duration of the selected collection item from the data acquisition time as the time (second time) that is when collection starts in such a way that the time is linked to the collection item (S405; subtraction step and setting step). The collection execution unit 104 then makes a determination again as to whether there is an unselected collection item in the collection item list (S404).

When there is no unselected collection item in the collection item list (S404, NO), the collection execution unit 104 makes a determination again as to whether there is an unselected device in the notification schedule (S402).

When there is no unselected collection item in the notification schedule at step S402 (S402, NO), the collection execution unit 104 regards the following list as what is illustrated as a collection schedule in FIG. 14: the collection item list where the time when collection starts is liked to the collection item as a collection time. The collection execution unit 104 transmits the collection schedule of each server in the order of the notification schedule as setting information and instructs the execution units to collect (S406).

Figure 15:
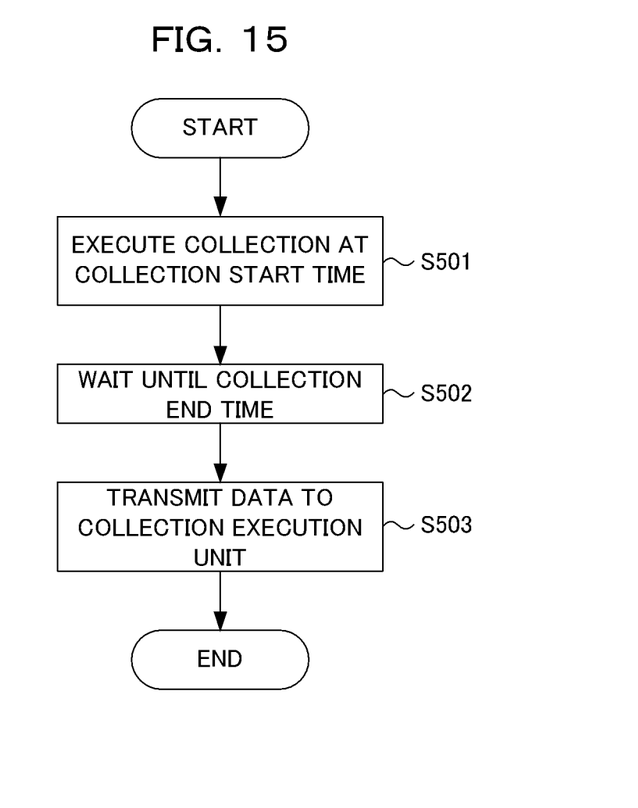
FIG. 15 is a flowchart illustrating the operation of execution units.

The following describes the operation of the execution units. FIG. 15 is a flowchart illustrating the operation of the execution units. Incidentally, in the case of FIG. 15, suppose the collection schedule that, as setting information, indicates the collection start time and collection order of each collection item have been already transmitted from the collection execution unit to the execution units and that the collection execution unit has already instructed the execution units to collect.

First, the execution units 201 start collecting each collection item recorded in the collection schedule transmitted from the collection execution unit 104 at the corresponding collection time (S501). The execution units 201 wait until the collection end time (S502) and transmit the collected data of the collection items to the collection execution unit 104 (S503). Incidentally, at step S501, as for the collection items having the same collection start time, the execution units 201 start collecting in the order that the collection items are arranged in the collection schedule, i.e. in descending order of the frequency of update.

Figure 16:
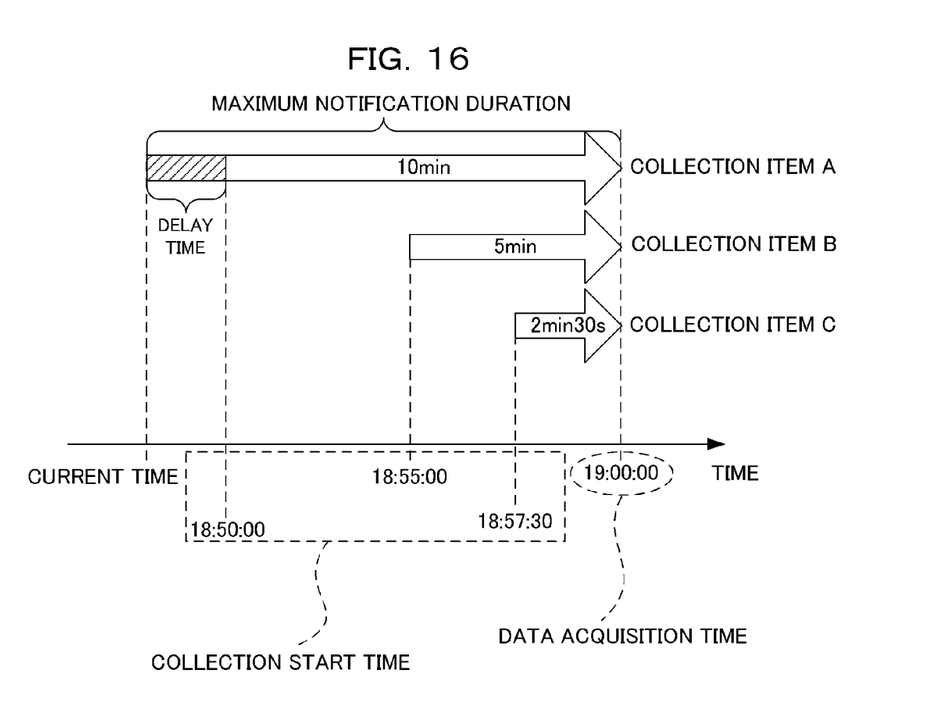
FIG. 16 is a diagram illustrating the timing when collection starts.
Figure 17:
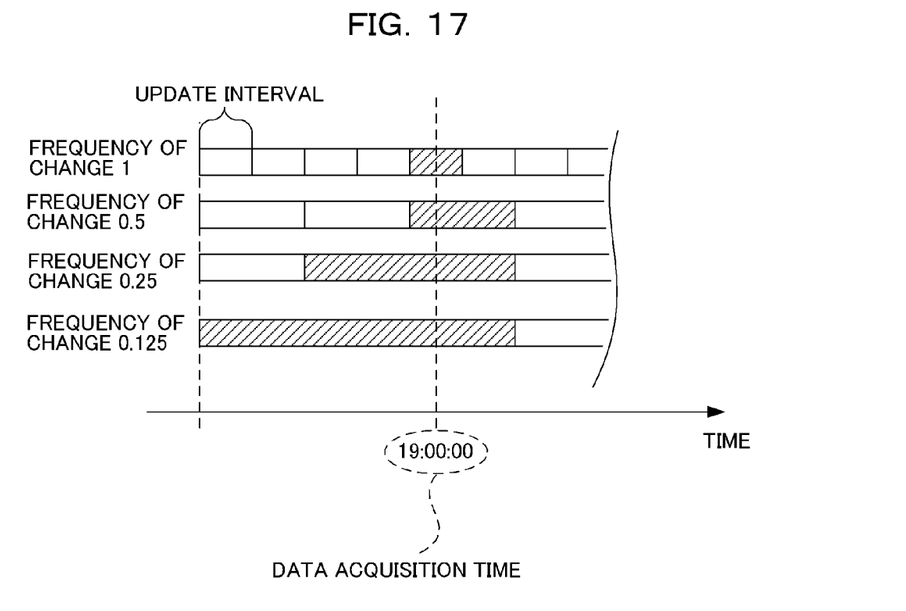
FIG. 17 is a diagram illustrating the data acquisition timing and the frequency of change.

As described above, the information collection device 10 of the present embodiment collects information in accordance with the collection item for which the sum of the collection duration and the delay time of the device is largest. The following provides a more detailed description of the effects of the present invention with reference to the accompanying drawings. FIG. 16 is a diagram illustrating the timing when collection starts. FIG. 17 is a diagram illustrating the data acquisition timing and the frequency of update.

As illustrated in FIG. 16, the information collection device 10 of the present embodiment adds the largest notification duration (the delay time+the maximum collection duration in the item of the device) to the current time to obtain the data acquisition time. The information collection device 10 then subtracts the collection duration of each collection item from the data acquisition time to obtain the collection start time. That is, on the basis of the time when the information of the collection item that takes the most time to collect may be acquired, the acquisition timings of the other collection items are adjusted to the time. Therefore, the information collection device 10 of the present embodiment may acquire information about all the collection items of all the devices.

When the collection items have the same collection duration, the information collection device 10 of the present embodiment acquires information about the collection items in descending order of the frequency of update, i.e. in ascending order of update intervals. Therefore, as illustrated in FIG. 17, the information about the collection items may be acquired before the information is changed by an updating process.

As described above, according to the present invention, for example, when the failure of a system consisting of a plurality of devices occurs, it is possible to synchronously collect device information as soon as possible at an arbitrary timing.

The present invention may be embodied in other various forms without departing from the spirit and essential characteristics thereof. The embodiments described therefore are to be considered in all respects as illustrative and not restrictive. The scope of the invention is indicated by the appended claims, not by the foregoing description. Furthermore, all variations, various modifications, alternatives and alterations which come within the meaning and range of equivalency of the claims are all intended to be embraced within the scope of the present invention.

A program that executes each of the above steps on a computer that makes up the information collection device may be provided as an information collection program. The above program is stored in a computer-readable storage medium so that the computer that makes up the information collection device may execute the program. The above computer-readable storage media include: an internal storage device installed in a computer, such as a ROM or RAM; a portable storage medium, such as a CD-ROM, flexible disk, DVD disk, magnetic optical disk or IC card; a data base that stores computer programs; and another computer and a database thereof.

According to the present invention, it is possible to synchronously collect information from a plurality of devices at an arbitrary timing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. An information collection device that acquires information from a plurality of servers connected through a network, comprising:
    a computer processor, wherein the computer processor executes a process comprising:
    storing collection history information and collection item information for the plurality of servers;
    calculating, for each server of the plurality of servers, an estimated delay time of the server based on an average delay time of all collection items recorded in the collection history information of the server;

calculating, for each collection item of a respective server, a frequency of change for the collection item by dividing a number of times the collection item has been acquired by a number of times the collection item has changed recorded in the collection item information of the respective server;

adding, for each server of the plurality of servers, the estimated delay time of the server to a stored maximum collection duration, representing a longest duration of time required to collect a collection item from the server, to determine a notification duration;

adding a longest notification duration of the determined notification durations of the plurality of servers to a current time to determine a data acquisition time;

subtracting, for each collection item, a collection duration, representing a duration of time required to collect the collection item, from the data acquisition time to obtain and set a collection start time for the collection item;

creating a collection schedule indicating the collection start time and a collection order of each collection item to collect from each server, wherein the collection order for each server is arranged based on the collection start times of the collection items and wherein collection items having the same collection start time are sorted in descending order of their frequency of change; and performing information collection from the plurality of servers based on the collection order, wherein the information collection for a particular collection item starts at the respective collection start time of the particular collection item.

2. The information collection device according to claim 1, wherein:

the collection items collected from the plurality of servers are information that is changed at predetermined intervals; and the computer processor further executes a process comprising, setting each of the plurality of servers so that collection items having the same collection duration are collected in descending order of the calculated frequency of change.

3. The information collection device according to claim 2, wherein the number of times a collection item has changed is a cumulative number representing when the collection item is different from the previously collected collection item.

4. The information collection device according to claim 1, wherein:

the plurality of servers start information collection at the set collection start times; and the computer processor acquires the collection items collected by each of the plurality of servers at the data acquisition time.

5. The information collection device according to claim 1, wherein the collection items collected from each of the plurality of servers is about resources of the plurality of servers.

6. A computer readable non-transitory medium having recorded thereon a program that causes a computer connected to a plurality of servers through a network to execute a process comprising:

storing collection history information and collection item information for the plurality of servers;

calculating, for each server of the plurality of servers, an estimated delay time of the server based on an average delay time of all collection items recorded in the collection history information of the server;

calculating, for each collection item of a respective server, a frequency of change for the collection item by dividing a number of times the collection item has been acquired by a number of times the collection item has changed recorded in the collection item information of the respective server;

adding, for each server of the plurality of servers, the estimated delay time of the server to a stored maximum collection duration, representing a longest duration of time required to collect a collection item from the server, to determine a notification duration;

adding a longest notification duration of the determined notification durations of the plurality of servers to a current time to determine a data acquisition time;

subtracting, for each collection item, a collection duration, representing a duration of time required to collect the collection item, from the data acquisition time to obtain and set a collection start time for the collection item;

creating a collection schedule indicating the collection start time and a collection order of each collection item to collect from each server, wherein the collection order for each server is arranged based on the collection start times of the collection items and wherein collection items having the same collection start time are sorted in descending order of their frequency of change; and performing information collection from the plurality of servers based on the collection order, wherein the information collection for a particular collection item starts at the respective collection start time of the particular collection item.

7. The computer readable non-transitory medium according to claim 6, wherein:

the collection items collected from the plurality of servers are information that is changed at predetermined intervals; and the process further comprises:

setting each of the plurality of servers so that collection items having the same collection duration are collected in descending order of the calculated frequency of change.

8. The computer readable non-transitory medium according to claim 7, wherein the number of times a collection item has changed is a cumulative number representing when the collection item is different from the previously collected collection item.

9. The computer readable non-transitory medium according to claim 6, wherein:

the plurality of servers start information collection at the set collection start times; and acquiring the collection items collected by each of the plurality of servers at the data acquisition time.

10. The computer readable non-transitory medium according to claim 6, wherein the collection items collected from each of the plurality of servers is about resources of the plurality of servers.

11. An information collection method of acquiring information from a plurality of servers connected through a network comprising:

storing collection history information and collection item information for the plurality of servers;

calculating, for each server of the plurality of servers, an estimated delay time of the server based on an average delay time of all collection items recorded in the collection history information of the server;

calculating, for each collection item of a respective server, a frequency of change for the collection item by dividing a number of times the collection item has been acquired by a number of times the collection item has changed recorded in the collection item information of the respective server;

adding, for each server of the plurality of servers, the estimated delay time of the server to a stored maximum collection duration, representing a longest duration of time required to collect a collection item from the server, to determine a notification duration;

adding a longest notification duration of the determined notification durations of the plurality of servers to a current time to determine a data acquisition time;

subtracting, for each collection item, a collection duration, representing a duration of time required to collect the collection item, from the data acquisition time to obtain and set a collection start time for the collection item;

creating a collection schedule indicating the collection start time and a collection order of each collection item to collect from each server, wherein the collection order for each server is arranged based on the collection start times of the collection items and wherein collection items having the same collection start time are sorted in descending order of their frequency of change; and performing information collection from the plurality of servers based on the collection order, wherein the information collection for a particular collection item starts at the respective collection start time of the particular collection item, wherein the calculating, the adding and the subtracting steps are performed by a computer processor.

12. The information collection method according to claim 11, wherein:

the collection items collected from the plurality of servers are information that is changed at predetermined intervals; and the information collection method further comprises:

setting each of the plurality of servers so that collection items having the same collection duration are collected in descending order of the calculated frequency of change.

13. The information collection method according to claim 11, wherein:

the plurality of servers start information collection at the set collection start times; and acquiring the collection items collected by each of the plurality of servers at the data acquisition time.

14. The information collection method according to claim 11, wherein the collection items collected from each of the plurality of servers is about resources of the plurality of servers.

* * * * *